(No Model.)
N. J. PRITCHARD.
VARIABLE SPEED GEARING.
No. 515,610. Patented Feb. 27, 1894.
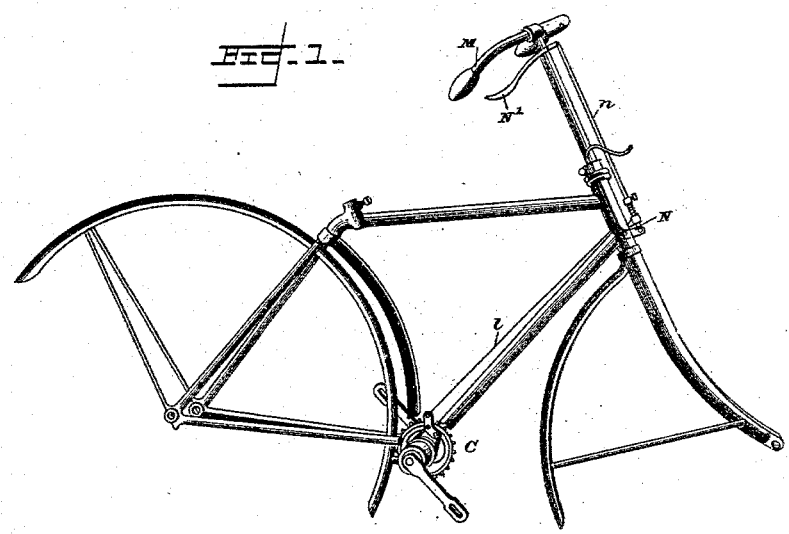
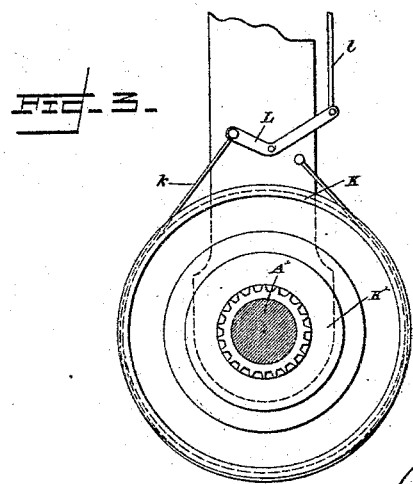

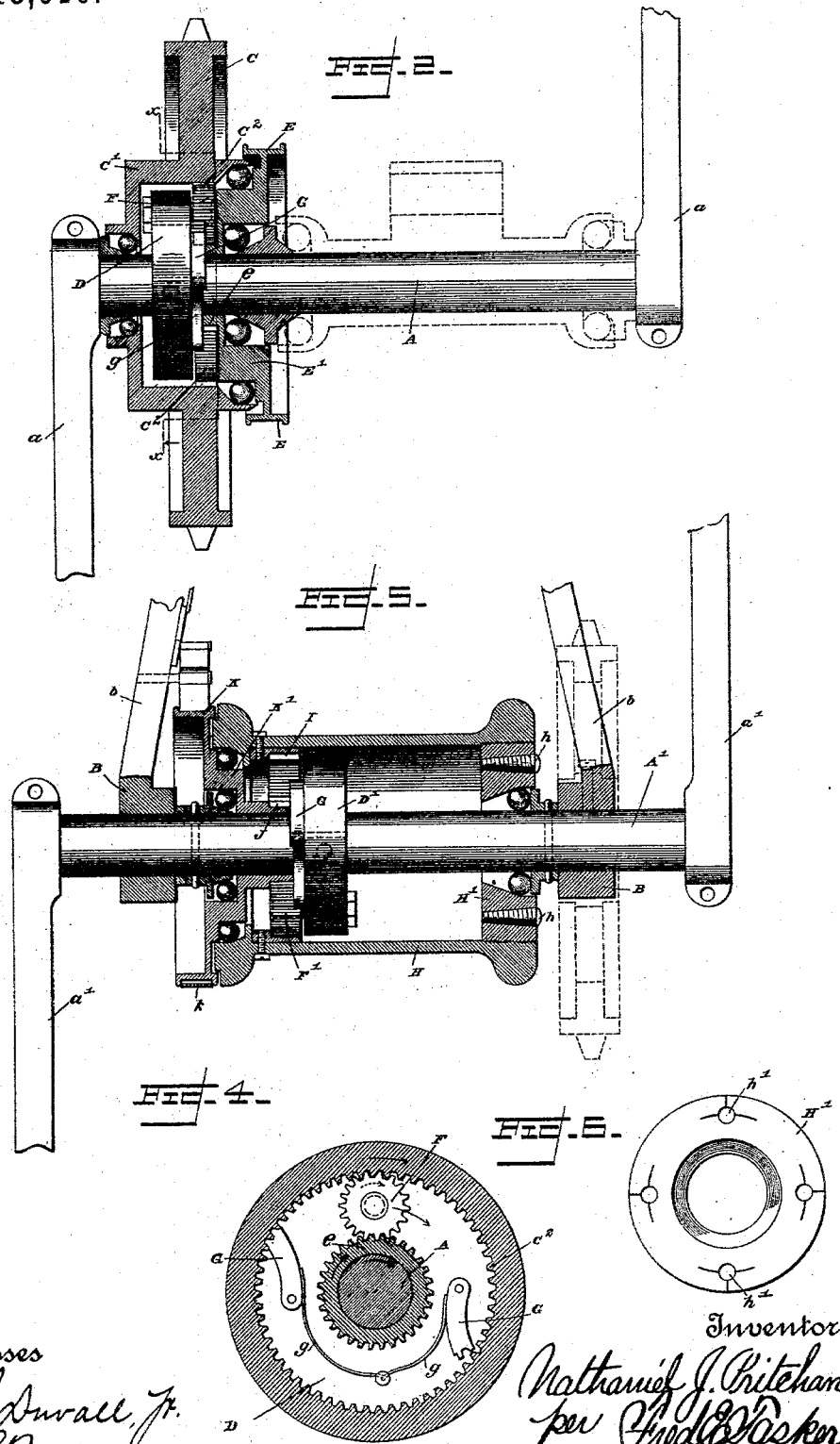

UNITED STATES PATENT OFFICE.

NATHANIEL J. PRITCHARD, OF SHENANDOAH, VIRGINIA, ASSIGNOR OF TWO-THIRDS TO SAMUEL REESE PRITCHARD AND JOHN CURTIS SCHOOLEY, OF SAME PLACE.

VARIABLE-SPEED GEARING.

SPECIFICATION forming part of Letters Patent No. 515,610, dated February 27, 1894.

Application filed October 24, 1892. Serial No. 449,874. (No model.)

*To all whom it may concern:*

Be it known that I, NATHANIEL J. PRITCHARD, a citizen of the United States, residing at Shenandoah, in the county of Page and State of Virginia, have invented certain new and useful Improvements in Variable-Speed Gearing; and I do hereby declare the following to be a full, clear, and exact description of the invention, such as will enable others skilled in the art to which it appertains to make and use the same.

This invention has reference to speed regulating mechanism for bicycles, velocipedes or other carriages.

The object is to provide means for easily increasing the speed to a greater or less extent whenever desired, said means to be entirely under the control of the rider at all times, so that by the manipulation on his part of conveniently arranged devices, the change of speed may at any time be accomplished.

The invention therefore consists essentially in the construction, arrangement and combination of parts and in certain peculiarities and details, substantially as will be hereinafter described and claimed.

In the accompanying drawings illustrating my invention: Figure 1 is a perspective view of a portion of a safety bicycle provided with my present improvements. Fig. 2 is a vertical sectional elevation of my improved speed increasing mechanism showing the same applied to a pedal shaft of a safety bicycle. Fig. 3 is a detail view of the friction wheel and brake strap. Fig. 4 is a sectional elevation on the line $x\,x$ of Fig. 2. Fig. 5 is a sectional elevational view similar to Fig. 2, and showing the invention applied to the shaft of the large wheel of a common upright style of machine. Fig. 6 is a right hand end view of the inserted head of the hub shown in Fig. 5.

Similar letters of reference designate corresponding parts throughout all the different figures of the drawings.

My improved speed increasing mechanism is applicable to many different kinds of machinery. It is particularly and primarily useful in connection with bicycles or other velocipedes. In the present case I shall explain the same as applied to the pedal shaft of a safety and also as applied to the shaft of the large wheel of an upright machine. It is not to be inferred however that I consider myself restricted to these two uses of my improvements and I explicitly state that the same will be found useful in the broad field of machinery.

My invention utilizes as a part of its mechanism, an epicyclic train of gearing and in so doing I secure the advantage possessed by this class of gearing in producing accelerated motion.

I am aware that epicyclic trains have heretofore been used in connection with bicycle shafts. I do not therefore broadly claim the same, but as will appear hereinafter, I claim to so combine the speed gearing with the shaft to which it is applied, in connection with the other adjunctive parts as to accomplish novel and valuable results, both in combination and in function, having superior utility and capable of a wider and more extended use than is the case with other combinations for the same purpose now in common use.

By referring to Fig. 2, my invention will be seen applied to a pedal shaft of a safety bicycle, a partial view of such safety machine being shown in Fig. 1.

A denotes the pedal shaft, provided with the pedal cranks $a\,a$ adapted to carry the pedals at their outer ends. The sprocket or chain wheel C, having a casing C', is located loosely upon the shaft A, suitably arranged ball bearings being placed wherever they will do the most good in making an easy movement.

On shaft A is a pulley D rigidly secured thereto and located inside of the sprocket wheel casing C'. This pulley D carries a pinion F supported by a stud or journal held horizontally in the pulley D. The pinion F engages the teeth of the series of internal cogs $C^2$ on the inside surface of the casing C', all as clearly shown in Fig. 2. Pinion F likewise engages the teeth of a gear wheel $e$, which loosely surrounds the shaft A. The three gears $C^2$, F and $e$ lie in the same vertical plane or in other words, in line with each other. The gear wheel or pinion $e$ is integral with a sleeve E', which is likewise integral with a larger pulley E, having a grooved rim adapted for the application thereto of a brake strap in the same manner that the brake strap *k* is applied to the periphery of the wheel K, in Fig. 3.

Connections will be made between the frictionally acting brake strap surrounding the wheel E and a lever situated near the steering apparatus, M, of the machine so that the rider may at any time apply the brake strap to or release it from the wheel E, thereby stopping, retarding or starting the latter. It will be evident that as the shaft A revolves, the pulley D will likewise revolve, carrying with it the pinion F, and since this pinion F is in mesh with the gears $C^2$ and *e*, the result will be to drive the sprocket wheel C and also friction wheel E in the same direction, but at a uniform rate of speed. Such will be the case when the friction wheel E is free to move under the actuation of the gearing. If however, we stop the wheel E by applying the brake strap thereto, we make it a fixed wheel, or in other words a dead wheel, and this will cause the pinion F to revolve on its own axis and drive the sprocket C at a much higher rate of speed, such being the characteristic effect of the epicyclic train of gearing, including one dead or stationary gear. The speed is proportional to the number of teeth in the wheels between which the idler or planet wheel operates. Now if instead of stopping the friction wheel E, we simply retard it or slow it up, we will speed up the sprocket wheel C to a certain extent, but not to as high a speed as before. Thus by regulating the action of the wheel E and its speed, we can determine any desired increase for the speed of the sprocket wheel and consequently can regulate and govern easily and with great facility, the speed of the machine.

In Fig. 4, I have shown a couple of pawls G G, pivoted to the side of the pulley D' and having springs *g g* bearing upon them to force their teeth into engagement with the teeth of the internally cogged gear $C^2$. This arrangement of pawls is for the purpose of preventing any backward movement of the sprocket wheel and causing the result of the movement of the intermeshed gears to be forward or in the proper direction of rotation to propel the bicycle in the right manner. These pawls cause the hub to be carried at least as fast as the crank shaft. It will be observed furthermore that I use numerous ball bearings in connection with the construction shown in Fig. 2, in order to secure ease of movement in all the parts.

In Fig. 5, I have shown my invention as applied to the large wheel of an upright bicycle, so called. The main construction of the essential parts of the combination is the same in this figure, as in Fig. 2, but the arrangement and application are somewhat different. A' denotes the shaft having secured thereon the pedal crank arms *a' a'*. H denotes the hub of the large wheel, to which the spokes are to be attached. B designates the fork or frame with branches *b b* astride the wheel. The shaft A' is journaled in bearings in the frame B. On the shaft A' is secured rigidly so as to revolve therewith, a pulley D' which is substantially the same as the pulley D, in Fig. 2, said pulley D' carrying a pinion F' on a stud projecting horizontally therefrom, said pinion being substantially the same as the pinion F in Fig. 2. Pinion F' meshes with the teeth of the cogged rim I which is inserted into the hub H and secured therein so as to provide an internally cogged gear wheel. The pinion F' also meshes with the gear wheel J which is formed as a loose sleeve on the shaft A' and is integral with the sleeve K', of larger diameter, which in turn is integral with and formed as a part of the friction pulley K having a peripherally-grooved rim, which receives the strap *k*, which acts frictionally thereon as a brake strap to retard or stop the wheel, substantially in the manner to be hereinafter more fully set forth. Ball bearings are inserted between the sleeve K' and shaft A' and also between said sleeve and the bell-shaped end of the hub H. The opposite end of the hub H, is provided with a head H' screwed thereinto. Said head H' is shown in detail in Fig. 6. It is provided with a series of screw holes *h'* therein, from which screw holes radiate slits which serve to give the material adjacent to the screw holes a spring action. Said screw holes are conical in shape, to receive the conical screws *h*. When these screws are screwed into place, the material of the heads immediately surrounding the screw holes, will in consequence of the aforesaid slits be expanded sufficiently to lock the head firmly in position. It will be evident that with the pinion F' meshing with the gear wheel I, which is rigid on the head H' that carries the spokes of the wheel and with said pinion also meshing with the gear wheel J, integral with and formed as a part of the brake wheel K, said pinion F' and gear I and gear J, being in the same plane or in line with each other, the same results will follow out from their inter-operation as proceeds from the actuation of the similar parts represented in Fig. 2. The effect will be the same as that which proceeds from the operation of an ordinary sun and planet gear or epicyclic train, because when the brake wheel K is loose, then the actuation of the shaft A' will drive the head H' and the wheel K at the same rate of speed, but when the friction wheel K, has in consequence of the manipulation of the lever N', Fig. 1, through the connection *n*, N, link *l*, crank lever L and brake strap *k*, caused the friction wheel K to be retarded or to come to a standstill, then the gear J will be a fixed element or a dead element and the consequence will be that the hub H will run at twice the rate of speed as before, or if the friction wheel K has not been entirely stopped, but simply retarded, the speed of the hub H will be increased proportionately to the retardation of the wheel K and thus a variable increase of speed is easily occasioned by the rider as a result of simply manipulating the lever situated near the steering head.

In the construction shown in Fig. 5 as well as in the construction shown in Fig. 2, I employ the pawls G G shown in Fig. 6.

Having thus described my invention, what I claim as new, and desire to secure by Letters Patent, is—

1. The combination with a shaft with a fixed pulley thereon, a driven wheel having a gear, a friction wheel having likewise a gear and a pinion carried by the fixed pulley on the shaft and meshing with the two aforesaid gears, together with mechanism for stopping or retarding the revolution of the friction wheel, and the pawls connecting the driving wheel gear with the pulley substantially as described.

2. In a bicycle, velocipede or other machine, the combination with the actuating shaft and the driven wheel, of a pulley on said shaft, a pinion carried by a stud on said pulley near its periphery, an internally cogged gear wheel on the driven wheel, a loose gear on the shaft, said pinion and said two gears being in the same vertical line and intermeshing to form an epicyclic train spring-provided pawls on the pulley engaging the internal gear and a friction wheel connected to the loose gear, together with mechanism for retarding or stopping the said friction wheel so as to retard or stop said loose gear wheel, substantially as described.

3. In a bicycle, velocipede or other machine, the combination with the drive shaft epicyclic train, and fixed pulley on the drive shaft of the frame B, the friction wheel connected to one gear of the train, the hub, the spring-provided pawls on the fixed pulley engaging one of the gears the strap surrounding the friction wheel and the leverage connections between said strap and the lever on the steering head, substantially as specified.

4. The combination with the shaft A and sprocket wheel C, having casing C', and internal gear $C^2$, of the pulley D fast on shaft A and carrying pinion F loosely on the stud, friction wheel E having an integral or connected gear wheel $e$ all arranged so that the pinion F will be in engagement with the gear wheel E and also the gear wheel $C^2$, and the pawls G G on the fixed pulley D and engaging the gear $C^2$ substantially as described.

5. The combination of a shaft A, sprocket wheel C, having casing C' and the gear wheel $C^2$, pulley D, fast on shaft A, and carrying pinion F, friction wheel E integral with gear wheel $e$ and spring actuated pawls G G on the fixed pulley D and engaging the gear $C^2$, substantially as described.

6. The combination of a drive shaft, an epicyclic gearing, a pulley on said shaft, pawls arranged on the pulley and engaging the internal gear of the epicyclic train, a friction wheel connected to that gear of the train which is loose on the shaft, and a brake applied to the friction wheel, all arranged substantially as described.

In testimony whereof I affix my signature in presence of two witnesses.

NATHANIEL J. PRITCHARD.

Witnesses:
C. J. STEVENS,
THOS. R. REEVES.